US012261379B2

(12) United States Patent
Kakuya et al.

(10) Patent No.: US 12,261,379 B2
(45) Date of Patent: Mar. 25, 2025

(54) ANTENNA DEVICE

(71) Applicant: DENSO CORPORATION, Kariya (JP)

(72) Inventors: Yuuji Kakuya, Nisshin (JP); Masakazu Ikeda, Nisshin (JP); Kenichirou Sanji, Kariya (JP); Tomokazu Miyashita, Kariya (JP); Ryozou Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 18/070,277

(22) Filed: Nov. 28, 2022

(65) Prior Publication Data

US 2023/0092857 A1 Mar. 23, 2023

Related U.S. Application Data

(63) Continuation of application No. PCT/JP2021/023456, filed on Jun. 21, 2021.

(30) Foreign Application Priority Data

Jun. 26, 2020 (JP) ................................. 2020-110670

(51) Int. Cl.
*H01Q 9/04* (2006.01)
*H01Q 1/32* (2006.01)
*H01Q 1/48* (2006.01)

(52) U.S. Cl.
CPC ......... *H01Q 9/0421* (2013.01); *H01Q 1/3291* (2013.01); *H01Q 1/48* (2013.01)

(58) Field of Classification Search
USPC .......................................................... 343/848
See application file for complete search history.

(56) References Cited

U.S. PATENT DOCUMENTS

| | | | | |
|---|---|---|---|---|
| 6,421,016 | B1 | 7/2002 | Phillips et al. | |
| 2010/0289619 | A1 | 11/2010 | Kosugi et al. | |
| 2015/0357714 | A1* | 12/2015 | Ng | H01Q 1/3275 343/848 |
| 2019/0131699 | A1* | 5/2019 | Shamblin | H01Q 19/005 |
| 2022/0006195 | A1 | 1/2022 | Ikeda et al. | |

FOREIGN PATENT DOCUMENTS

| | | | | | |
|---|---|---|---|---|---|
| DE | 112008001405 | T5 * | 4/2010 | H01Q 1/243 |
| JP | 2005027134 | A | 1/2005 | |
| JP | 2007013643 | A * | 1/2007 | H01Q 21/28 |
| JP | 2010028500 | A | 2/2010 | |
| JP | 4992762 | B2 | 8/2012 | |
| JP | 5341611 | B2 | 11/2013 | |
| WO | WO-0030211 | A1 * | 5/2000 | H01Q 1/38 |
| WO | WO-2020195110 | A1 | 10/2020 | |

* cited by examiner

*Primary Examiner* — Hoang V Nguyen
*Assistant Examiner* — Brandon Sean Woods
(74) *Attorney, Agent, or Firm* — Harness, Dickey & Pierce, P.L.C.

(57) ABSTRACT

An antenna device includes a ground plate and an antenna element. The ground plate is a conductor member with a flat rectangular shape. The antenna element is a conductor member having a feed point electrically connected to a feeder line. A length of the ground plate in a predetermined direction is shorter than a target wavelength that is a wavelength of a radio wave to be transmitted or received. The ground plate is connected to a grounding cable at a connection position on the ground plate. The connection position is shifted from an edge of the ground plate by an odd multiple of ¼ of the target wavelength.

10 Claims, 6 Drawing Sheets

ANTENNA DEVICE

CROSS-REFERENCE TO RELATED APPLICATIONS

The present application is a continuation application of International Patent Application No. PCT/JP2021/023456 filed on Jun. 21, 2021, which designated the U.S. and claims the benefit of priority from Japanese Patent Application No. 2020-110670 filed on Jun. 26, 2020. The entire disclosures of all of the above applications are incorporated herein by reference.

TECHNICAL FIELD

The present disclosure relates to an antenna device that is used while being connected to an external device with a cable.

BACKGROUND

Various antenna devices, such as a monopole antenna, a patch antenna and the like, have been developed.

SUMMARY

According to at least one embodiment of the present disclosure, an antenna device includes a ground plate and an antenna element. The ground plate is a conductor member with a flat rectangular shape. The antenna element is a conductor member having a feed point electrically connected to a feeder line. A length of the ground plate in a predetermined direction is shorter than a target wavelength that is a wavelength of a radio wave to be transmitted or received. The ground plate is connected to a grounding cable at a connection position on the ground plate. The connection position is shifted from an edge of the ground plate by an odd multiple of ¼ of the target wavelength.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTIONS

Figure 1:
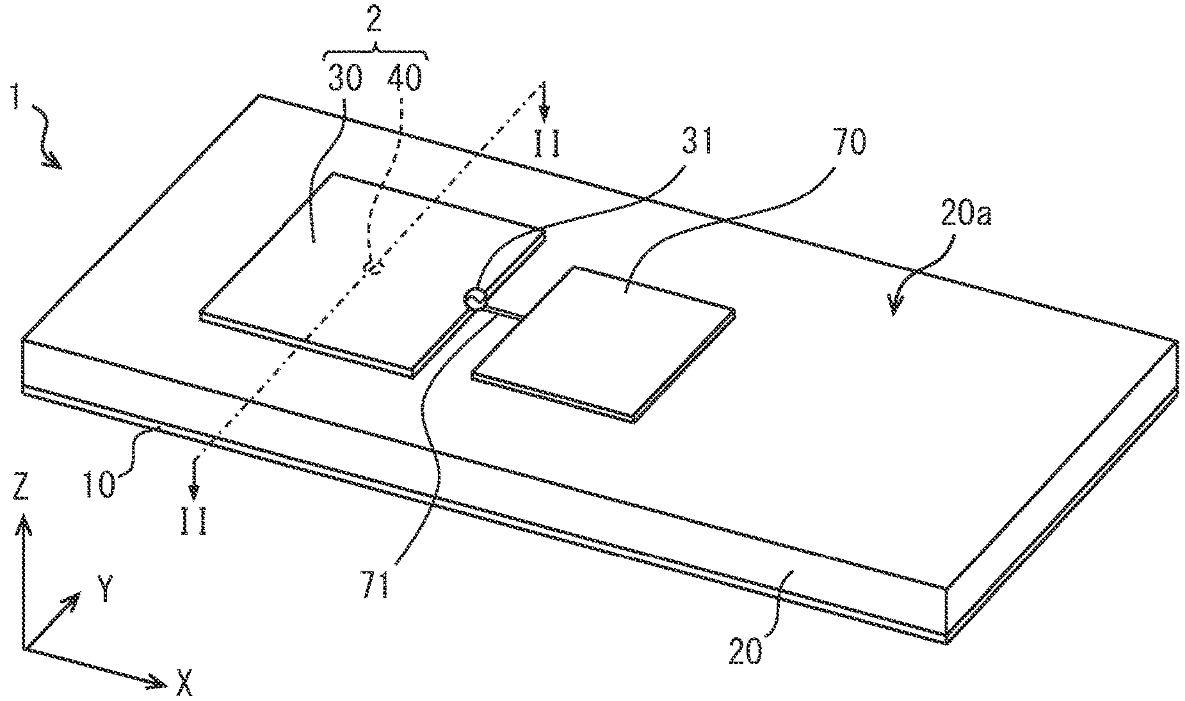
FIG. 1 is a perspective external view of an antenna device.

To begin with, examples of relevant techniques will be described. According to a comparative example, an antenna device includes a ground plate that is a conductive plate having a ground potential, separately from a radiating element.

In the antenna device, when a size of the ground plate is insufficient for wavelength of a radio wave which is transmitted and/or received by the antenna device, a leakage current that is a current leaking from the ground plate to the cable may increase, thereby decreasing a gain and/or destabilizing directivity.

In the comparative example, the leakage current to the cable is reduced by filtering high-frequency current using a filter element that is a circuit element that functions as a low-pass filter.

Since the configuration of the comparative example requires the filter element, a total cost may increase by an amount of cost for the filter element.

In contrast to the comparative example, according to the present disclosure, a leakage current to a cable can be reduced while reducing an increase in cost.

According to an aspect of the present disclosure, an antenna device, for example, includes a ground plate and an antenna element. The ground plate is a conductor member with a flat rectangular shape. The antenna element is a conductor member having a feed point electrically connected to a feeder line. A length of the ground plate in a predetermined direction is shorter than a target wavelength that is a wavelength of a radio wave to be transmitted or received. The ground plate is connected to a grounding cable at a connection position on the ground plate. The connection position is shifted from an edge of the ground plate by an odd multiple of ¼ of the target wavelength.

The developers of the present disclosure have conducted experiments on an operation of an antenna device with a ground plate having a small area by simulation and other means, and found that positions on the ground plate shifted from an edge of the ground plate by odd multiples of ¼ of the target wavelength behave as nodes in a potential distribution. A node in the potential distribution is a position where an electric potential is minimum. The above configuration has been created based on these findings. According to the configuration in which the grounding cable is connected to the ground plate at the connection position shifted by the odd multiple of ¼ of the target wavelength from the edge of the ground plate, a potential difference is unlikely to occur between the grounding cable and the ground plate. Therefore, leakage current can be reduced. Further, according to the above configuration, a filter element for reducing the leakage current to the cable is not required. That is, the leakage current to the cable can be reduced while an increase in cost is reduced.

Hereinafter, an embodiment of the present disclosure will be described below with reference to the drawings. In the following embodiment, members having the same function will be assigned the same reference numeral, and the descriptions thereof will be omitted. When only a part of a configuration is described, the other parts of the configuration may employ a preceding configuration described in the embodiment.

Figure 2:
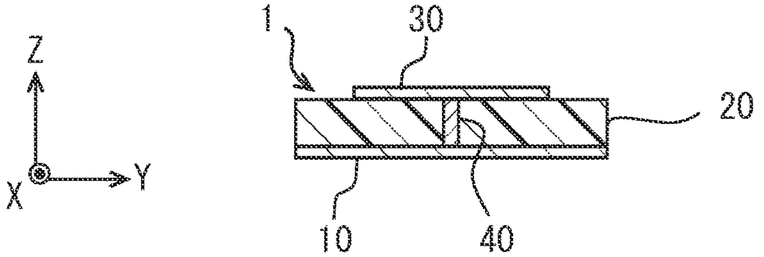
FIG. 2 is a schematic diagram showing a cross section taken along a line II-II shown in FIG. 1.

FIG. 1 is an exterior perspective view illustrating an example of a schematic structure of an antenna device 1 according to the present embodiment. FIG. 2 is a cross sectional view of the antenna device 1 along the line II-II illustrated in FIG. 1. The antenna device 1 is used while being installed in a moving body such as a vehicle.

The antenna device 1 is configured to transmit and receive radio waves at a predetermined target frequency. Of course, as another mode, the antenna device 1 may be used only for transmission or only for reception. Since transmission and reception of radio waves are reversible, a configuration capable of transmitting radio waves at a predetermined frequency is also a configuration capable of receiving radio waves at the predetermined frequency.

Herein, the target frequency is, for example, 2.45 GHz. Of course, the target frequency may be set appropriately. In another embodiment, the target frequency may be, for example, 300 MHz, 760 MHz, 850 MHz, 900 MHz, 1.17 GHz, 1.28 GHz, 1.55 GHz, or 5.9 GHz. The antenna device 1 is capable of transmitting and receiving not only a radio wave having the target frequency but also a radio wave having a frequency within a predetermined range that has been determined with reference to the target frequency. For example, the antenna device 1 is configured to be capable of transmitting and receiving radio waves having frequencies belonging to a 2.4 GHz band, which is a band from 2400 MHz to 2500 MHz.

That is, the antenna device 1 is capable of transmitting and receiving radio waves in a frequency band used in short-range wireless communication such as Bluetooth (registered trademark) Low Energy, Wi-Fi (registered trademark), and ZigBee (registered trademark). In other words, the antenna device 1 is configured to be capable of transmitting and receiving radio waves in the frequency band (so-called ISM band) specified by the International Telecommunication Union and allocated for general use in the industrial, scientific, and medical fields.

"λ" hereinafter represents a target wavelength. The target wavelength is a wavelength of a radio wave having the target frequency. For example, "λ/2" and "0.5λ" indicate a half of the target wavelength, and "λ/4" and "0.25λ" indicate one quarter of the target wavelength. The wavelength (i.e., λ) of the 2.4 GHz radio wave in vacuum and air is 125 mm.

The antenna device 1 is connected via a cable to a communication ECU (i.e., Electronic Control Unit) installed in the vehicle, and signals received by the antenna device 1 are sequentially output to the communication ECU. Also, the antenna device 1 converts an electric signal input from the communication ECU into a radio wave, and radiates the radio wave. The communication ECU uses signals received by the antenna device 1, and also supplies the antenna device 1 with high-frequency power corresponding to transmission signals.

A case in which the antenna device 1 and the communication ECU are connected by AV wires will be described as an example. Each AV wire is a low-voltage wire for automobiles, which is realized by sheathing a soft copper stranded wire with an insulating material such as polyvinyl chloride, for example. "A" in the term "AV wire" indicates low voltage automotive wires, and the "V" indicates vinyl. The AV wires connected to the antenna device 1 include a grounding cable that is an AV wire for providing a ground potential, and a signal cable that is an AV wire through which data signals are transmitted. A thin low-voltage wire for automobiles (AVSS cable) or a compressed conductor ultra-thin vinyl chloride insulated low-voltage wire for automobiles (CIVUS cable) can be used as a connection cable between the antenna device 1 and the communication ECU. "SS" in the term "AVSS" indicates an ultra-thin type. "C", "I", "V" and "US" in the term "CIVUS" indicate a compressed conductor type, ISO standards, vinyl, and an ultra-thin wall type, respectively. The cable connecting the antenna device 1 and the communication ECU may be any other communication cable such as a coaxial cable and a feeder line. An impedance matching circuit or the like may be provided at a joint portion between the antenna device 1 and the cable.

Hereinafter, a specific structure of the antenna device 1 will be described. As shown in FIG. 1, the antenna device 1 includes a ground plate 10, a support plate 20, an opposing conductive plate 30, and a short-circuit portion 40. For convenience, each part will be described below while the antenna device 1 is assumed to be arranged such that a surface of the ground plate 10 on which the opposing conductive plate 30 is provided faces upward. That is, a direction from the ground plate 10 toward the opposing conductive plate 30 corresponds to an upward direction for the antenna device 1. A direction from the opposing conductive plate 30 toward the ground plate 10 corresponds to a downward direction for the antenna device 1.

The ground plate 10 is a conductive member having a plate shape and made of conductor such as copper. The ground plate 10 is provided along a lower surface of the support plate 20. The plate shape here also includes a thin film shape such as a metal foil. That is, the ground plate 10 may be a pattern that is formed on a surface of a resin plate such as a printed wiring board by electroplating or the like. The ground plate 10 may also be provided as a conductor layer arranged inside a multilayer substrate having conductor layers and insulating layers. The ground plate 10 is electrically connected to a grounding cable 51 and provides a ground potential (in other words, ground) in the antenna device 1. The ground plate 10 corresponds to a conductive plate that is directly or indirectly connected to the grounding cable 51. The grounding cable 51 can also be called a grounding wire. The grounding cable 51 may be an outer conductor of a coaxial cable. A position of a cable connection point 11 at which the grounding cable 51 connects to the ground plate 10, will be described later.

The ground plate 10 is formed in a rectangular shape. An electrical length of a short side of the ground plate 10 is set to 0.4λ, for example. Further, an electrical length of a long side of the ground plate 10 is set to 1.2λ. In this disclosure, an electrical length is an effective length in consideration of a fringing electric field, a wavelength shortening effect caused by a dielectric substance, and the like. This shape of the ground plate 10 corresponds to a rectangular shape in which a length of the ground plate 10 in a widthwise direction is set to be shorter than the target wavelength and a length of the ground plate 10 in a lengthwise direction is set to be twice the length in the widthwise direction or more. The length of the short side of the ground plate 10 may be 0.6λ or 0.8λ, for example. The short side of the ground plate 10 is longer than λ/4 at least. The length of the ground plate 10 in the lengthwise direction is at least longer than the length of the ground plate 10 in the widthwise direction, and may be 1.0λ or 1.5λ, for example. A length ratio of the short side to the long side of the ground plate 10 can be set to approximately 1:2, 1:3, 1:4, 2:3, or 2:5, for example. When the support plate 20 is formed of a dielectric material having a relative permittivity of 4.3, the target wavelength on the surface of the ground plate 10 is theoretically about 60 mm due to the wavelength shortening effect caused by the dielectric material of the support plate 20. Therefore, the electrical length of 1.2λ corresponds to 72 mm.

The X-axis shown in the various drawings such as FIG. 1 represents the lengthwise direction of the ground plate 10, the Y-axis represents the widthwise direction of the ground plate 10, and the Z-axis represents a vertical direction. The Y-axis direction corresponds to a predetermined direction. A three-dimensional coordinate system including the X-axis, the Y-axis, and the Z-axis is a concept for describing the configuration of the antenna device 1. As another aspect, when the ground plate 10 has a square shape, the direction along any one side can be the X-axis.

The ground plate 10 is at least larger than the opposing conductive plate 30. The dimensions of the ground plate 10 can be changed as appropriate. The electrical length of one side of the ground plate 10 may be set to a value smaller than 1.0λ, for example, ⅓ of the target wavelength. Further, a planar shape that is a shape of the ground plate 10 viewed from above may be appropriately changed. Here, as an example, the planar shape of the ground plate 10 is a rectangular shape, but alternatively, as another aspect, the planar shape of the ground plate 10 may be a square shape. The planar shape of the ground plate 10 may be another polygonal shape. For example, the ground plate 10 may have a square shape in which an electrical length of one side is set to 1.0λ. The rectangular shape includes rectangle and square.

The support plate 20 is a plate-shaped member and causes the ground plate 10 and the opposing conductive plate 30 to be separated by a predetermined distance so as to face each other. The support plate 20 has a rectangular flat plate shape, and a size of the support plate 20 is substantially the same as a size of the ground plate 10 when viewed from above. The support plate 20 is provided as a dielectric material having a predetermined relative permittivity, such as glass epoxy resin. Here, as an example, the support plate 20 is provided as a glass epoxy resin having a relative permittivity of 4.3, so-called FR4 (Flame Retardant Type 4).

In the present embodiment, as an example, the thickness H1 of the support plate 20 is 1.5 mm. The thickness H1 of the support plate 20 corresponds to a distance between the ground plate 10 and the opposing conductive plate 30. By adjusting the thickness H1 of the support plate 20, the distance between the opposing conductive plate 30 and the ground plate 10 can be adjusted. The specific value of the thickness H1 of the support plate 20 may be appropriately determined by simulations or experiments. The thickness H1 of the support plate 20 may be 2.0 mm or 3.0 mm, for example. The wavelength in the support plate 20 is about 60 mm due to the wavelength shortening effect of the dielectric material. Therefore, the value of 1.5 mm in thickness electrically corresponds to 1/40 of the target wavelength (that is, λ/40).

The support plate 20 fulfills at least the above-mentioned function, and the shape of the support plate 20 can be changed as appropriate. A configuration causing the opposing conductive plate 30 and the ground plate 10 to be arranged to face each other may be multiple columns. Further, in the present embodiment, a configuration in which a resin as a support plate 20 is filled between the ground plate 10 and the opposing conductive plate 30 is adopted, but the present embodiment may not be limited to this. The gap between the ground plate 10 and the opposing conductive plate 30 may be hollow or vacuum. The support plate 20 may have a honeycomb structure, for example. In addition, the structures exemplified above may be combined. When the antenna device 1 is provided as a printed wiring board, conductor layers included in the printed wiring board may be used as the ground plate 10 and the opposing conductive plate 30, and a resin layer separating the conductor layers may be used as the support plate 20.

The thickness H1 of the support plate 20 also functions as a parameter for adjusting a length of the short-circuit portion 40, as described later. In other words, the thickness H1 of the support plate 20 functions as a parameter for adjusting an inductance provided by the short-circuit portion 40. In addition, the thickness H1 also functions as a parameter for adjusting a capacitance formed by the ground plate 10 and the opposing conductive plate 30 facing each other.

A transmitting/receiving circuit 70 may be arranged on an upper surface 20*a* of the support plate 20 on which the opposing conductive plate 30 is arranged. The transmitting/receiving circuit 70 is a circuit module that performs at least one of modulation, demodulation, frequency conversion, amplification, digital-to-analog conversion, and detection. The transmitting/receiving circuit 70 is an electrical assembly of various parts such as an IC, an analog circuit element, and a connector. The transmitting/receiving circuit 70 is electrically connected to the opposing conductive plate 30 through a feeder line 71. The feeder line 71 is a microstrip, for example. The transmitting/receiving circuit 70 is also connected to the ground plate 10 through vias, short-circuit pins, or the like. The transmitting/receiving circuit 70 is also electrically connected to an AV wire used as the signal cable. That is, the transmitting/receiving circuit 70 is connected to the communication ECU via the signal cable. A position of connection between the signal cable and the antenna device 1 can be arbitrarily set on the antenna device 1.

The opposing conductive plate 30 is a conductive member having a plate shape and made of conductor such as copper. As described above, the plate shape here also includes a thin film shape such as copper foil. The opposing conductive plate 30 is arranged so as to face the ground plate 10 via the support plate 20. Similar to the ground plate 10, the opposing conductive plate 30 may also be a pattern formed on a surface of a resin plate such as a printed wiring board. In the present disclosure, "parallel" is not limited to a completely parallel state. For example, the expression "parallel" also includes a state inclined about 30 degrees. That is, the expression "parallel" includes a substantially parallel state. The expression "vertical" in the present disclosure is not limited to a completely vertical state, and includes a state inclined at an angle of from several degrees to about 30 degrees.

By arranging the opposing conductive plate 30 and the ground plate 10 so as to face each other, a capacitance is generated according to an area of the opposing conductive plate 30 and the distance between the opposing conductive plate 30 and the ground plate 10. The opposing conductive plate 30 has a size so as to generate a capacitance that resonates in parallel with the inductance of the short-circuit portion 40 at the target frequency. The area of the opposing conductive plate 30 is at least appropriately designed so as to provide a desired capacitance. The desired capacitance is a capacitance that operates at the target frequency in cooperation with the inductance of short-circuit portion 40. When f is the target frequency, L is the inductance of the short-circuit portion 40, and C is the capacitance formed between the opposing conductive plate 30 and the ground plate 10, a relational expression of $f=1/\{2\pi\sqrt{(LC)}\}$ is established. A person skilled in this art can determine an appropriate area of the opposing conductive plate 30 based on the relational expression.

For example, the opposing conductive plate 30 is formed in a square shape having a side of an electrical length corresponding to 12 mm. Since the wavelength on the surface of the opposing conductive plate 30 is about 60 mm due to the wavelength shortening effect of the support plate 20, 12 mm electrically corresponds to 0.2λ. Of course, the length of one side of the opposing conductive plate 30 may be changed as appropriate, and may be 14 mm, 15 mm, 20 mm or 25 mm, for example. The planar shape of the opposing conductive plate 30 may be a circle, a regular octagon or a regular hexagon, for example. Further, the opposing conductive plate 30 may have a rectangular shape or a long ellipse shape.

The opposing conductive plate 30 has a feed point 31. The feed point 31 is a portion where the feeder line 71 and the opposing conductive plate 30 are electrically connected. In this configuration, the feed point 31 can be arranged at any position on the opposing conductive plate 30. The feed point 31 is at least located at a position where an impedance matching with the feeder line 71 can be obtained. In other words, the feed point 31 is at least provided at a position where a return loss becomes a predetermined allowable level. The feed point 31 may be arranged at an arbitrary, for example, in a central region or an edge of the opposing conductive plate 30. Here, as an example, the feed point 31 is positioned on a straight line passing through a center of the opposing conductive plate 30 and parallel to the X-axis.

As a method of feeding power to the opposing conductive plate 30, various methods such as a direct connection power supply method and an electromagnetic coupling method can be adopted. The direct connection power supply method refers to a method in which the feeder line 71 and the opposing conductive plate 30 are directly connected. The electromagnetic coupling method refers to a power supply method using electromagnetic coupling between a microstrip line or the like for power supply and the opposing conductive plate 30.

The short-circuit portion 40 is a conductive member that electrically connects the ground plate 10 and the opposing conductive plate 30. The short-circuit portion 40 may be provided as a short-pin that is a conductive pin. The inductance of the short-circuit portion 40 can be adjusted by adjusting a diameter and a length of the short-pin of the short-circuit portion 40.

The short-circuit portion 40 is at least a linear member having one end electrically connected to the ground plate 10 and the other end electrically connected to the opposing conductive plate 30. When the antenna device 1 is provided as a printed wiring board as a base material, a via provided in the printed wiring board can be used as the short-circuit portion 40.

The short-circuit portion 40 is, for example, located at a conductive-plate-center. Here, the conductive-plate-center is a center of the opposing conductive plate 30. The conductive-plate-center corresponds to a center of gravity of the opposing conductive plate 30. Since the opposing conductive plate 30 has the square shape in the present embodiment, the conductive-plate-center corresponds to an intersection of two diagonal lines of the opposing conductive plate 30. When the ground plate 10 and the opposing conductive plate 30 are arranged to be concentric, the center of the opposing conductive plate 30 and a center of the ground plate 10 overlap in top view.

A position where the short-circuit portion 40 is located may not exactly coincide with the conductive-plate-center. The short-circuit portion 40 may be deviated by about several millimeters from the conductive-plate-center. The short-circuit portion 40 may be formed within a central region of the opposing conductive plate 30. The central region of the opposing conductive plate 30 is a region inside a line connecting points that internally divide line segments from the center to edges in a ratio of 1:5. From another point of view, the central region corresponds to a region of a figure that has a similar shape of and about ⅙ the size of the opposing conductive plate 30 and is Concentrically Overlapped with the Opposing Conductive Plate 30.

<Position of Opposing Conductive Plate 30 Relative to Ground Plate>

Figure 3:
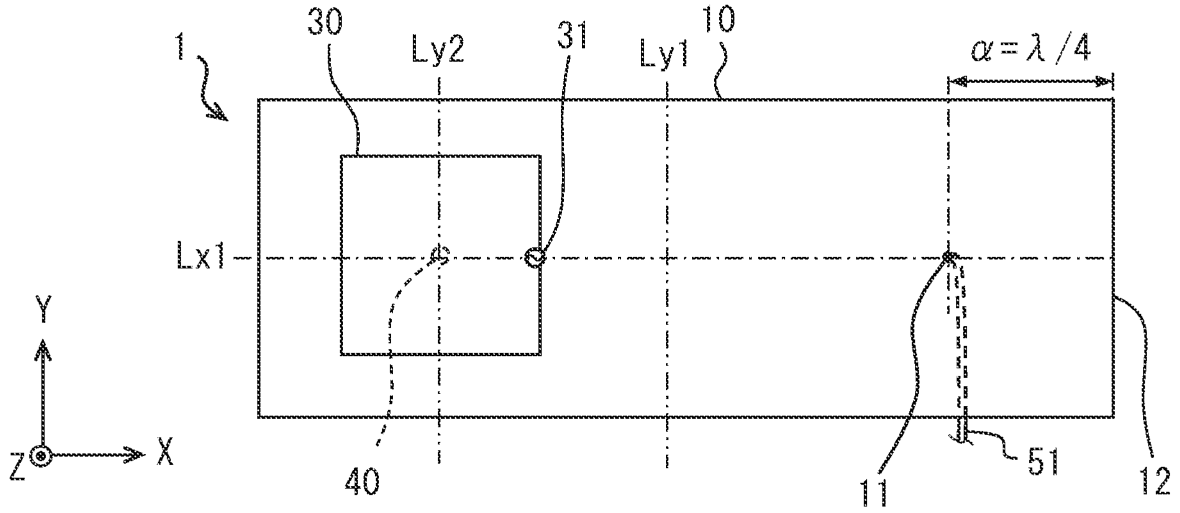
FIG. 3 is a top view of the antenna device.

As shown in FIG. 3, the opposing conductive plate 30 is disposed to face the ground plate 10 in such a manner that one set of opposite sides of the opposing conductive plate 30 is parallel to the X-axis and another set of opposite sides is parallel to the Y-axis. For example, the opposing conductive plate 30 is arranged at a position where its center is shifted from the center of the ground plate 10 by a predetermined offset amount ΔX in a negative direction of the X-axis. The offset amount ΔX can be, for example, 0.125λ, 0.25λ or 0.5λ, for example. The opposing conductive plate 30 may be aligned with an edge of the ground plate 10 that faces in the negative direction of the X-axis. The offset amount ΔX can be appropriately changed within a range in which the opposing conductive plate 30 does not protrude outward of the ground plate 10 when viewed from above. The opposing conductive plate 30 is arranged so that at least the entire region (i.e., entire surface) of the opposing conductive plate 30 faces the ground plate 10. The offset amount ΔX corresponds to an amount of deviation between the center of the ground plate 10 and the center of the opposing conductive plate 30.

In FIG. 3, the support plate 20, the transmitting/receiving circuit 70, etc. are transparent in order to clarify the positional relationship between the ground plate 10 and the opposing conductive plate 30. That is, illustrations of the support plate 20, the transmitting/receiving circuit 70, etc. are omitted in FIG. 3. The alternate long and short dash line Lx1 shown in FIG. 3 represents a straight line passing through the center of the ground plate 10 and parallel to the X-axis, and the alternate long and short dash line Ly1 represents a straight line passing through the center of the ground plate 10 and parallel to the Y-axis. The alternate long and two short dash line Ly2 represents a straight line that passes through the center of the opposing conductive plate 30 and is parallel to the Y-axis. From another point of view, the line Lx1 corresponds to the axis of symmetry for the ground plate 10 and the opposing conductive plate 30. The line Ly1 corresponds to the axis of symmetry for the ground plate 10. The line Ly2 corresponds to the axis of symmetry for the opposing conductive plate 30. The alternate long and short dash line Lx1 also passes through the center of the opposing conductive plate 30. That is, the alternate long and short dash line Lx1 corresponds a straight line parallel to the X-axis and passing through the center of the ground plate 10 and the center of the opposing conductive plate 30. The intersection of the line Lx1 and the line Ly1 corresponds to the center of the ground plate, and the intersection of the line Lx1 and the line Ly2 corresponds to the conductive-plate-center.

<Principle of Operation of Antenna Device>

Here, the operation of the antenna device 1 will be described. In the antenna device 1, the opposing conductive plate 30 is short-circuited to the ground plate 10 by the short-circuit portion 40 provided in the center region of the opposing conductive plate 30, and the area of the opposing conductive plate 30 is set to cause an electrostatic capacitance that resonates in parallel with the inductance of the short-circuit portion 40 at the target frequency.

Therefore, when a high-frequency signal is input from the transmitting/receiving circuit 70, an LC parallel resonance occurs due to an energy exchange between the inductance and the capacitance, and a vertical electric field perpendicular to the ground plate 10 and the opposing conductive plate 30 is generated between the ground plate 10 and the opposing conductive plate 30. This vertical electric field propagates from the short-circuit portion 40 toward the edge of the opposing conductive plate 30. Then, at the edge of the opposing conductive plate 30, the vertical electric field becomes a ground-plate vertically-polarized wave that is a linearly polarized wave with a polarization plane perpendicular to the ground plate 10, and propagates through space. That is, a structure including the short-circuit portion 40 and the opposing conductive plate 30 functions as a radiating element, in other words, as an antenna element 2. The ground-plate vertically-polarized wave here is a radio wave in which the vibration direction of the electric field is perpendicular to the ground plate 10 and the opposing conductive plate 30.

The antenna device 1 has directivity in an antenna horizontal direction at the target frequency. When the antenna device 1 is installed in the vehicle with the ground plate 10 being horizontal, the antenna device 1 functions as an antenna having a main beam in the horizontal direction. The antenna horizontal direction here is a direction from the center of the opposing conductive plate 30 toward the edge thereof. According to another viewpoint, the antenna horizontal direction is perpendicular to a perpendicular line of the ground plate 10 that passes through the center of the opposing conductive plate 30. The antenna horizontal direction corresponds to a transverse direction (i.e., lateral direction) of the antenna device 1.

The operation for transmitting (i.e. radiating) radio waves and the operation for receiving radio waves are mutually reversible in the antenna device 1. That is, the antenna device 1 is capable of receiving the ground-plate vertically-polarized wave coming in the antenna horizontal direction.

<Position of Cable Connection Point on Ground Plate>

In the present disclosure, the cable connection point 11, which is the point of connection between the grounding cable 51 and the ground plate 10, is located at a position shifted by a distance a equal to λ/4 from an edge (i.e., right edge in the drawing) of the ground plate 10 facing in a positive direction of the X-axis. Specifically, the cable connection point 11 is arranged at a position shifted inward from an antenna far edge 12 by λ/4 on the line Lx1 which is passing through the center of the ground plate 10 and parallel to the X-axis. The antenna far edge 12 is farther one of the opposite edges of the ground plate 10 in the lengthwise direction from the opposing conductive plate 30 of the antenna element 2. Hereinafter, the position on the ground plate 10 that is away by λ/4 from the antenna far edge 12 is also referred to as a λ/4 point.

The cable connection point 11 may be arranged at a position shifted from the edge of the ground plate 10 facing in the positive direction of the X-axis by a distance three or five times as large as λ/4. The cable connection point 11 is at least arranged at a position shifted by the distance a equal to λ/4×N (N is an odd number) from the edge of the ground plate 10. The cable connection point 11 is at least arranged at the position that is an odd multiple of λ/4 away from the antenna far edge 12. Thus, the position of the cable connection point 11 in the Y direction is not limited to on the line Lx1. The cable connection point 11 may be arranged at a position shifted in a positive or negative direction of the Y-axis from the position of the cable connection point 11 shown in FIG. 3.

The grounding cable 51 may extend from the cable connection point 11 parallel to the Y-axis, or located at least λ/20 away from the ground plate 10. According to this configuration, the grounding cable 51 can be prevented from being electrically or electromagnetically coupled to the ground plate 10 at locations other than the cable connection point 11.

<Operations and Effects>

As a result of simulations, it has been confirmed that a current flowing through the ground plate 10 due to the LC parallel resonance mainly flows from the short-circuit portion 40 toward the edges of the ground plate 10. The current that flows into the ground plate 10 from the opposing conductive plate 30 through the short-circuit portion 40 flows from the short-circuit portion 40 toward both sides of the ground plate 10 in the lengthwise direction. That is, the current flowing through the ground plate 10 flows from the short-circuit portion 40 toward the antenna far edge 12.

Figure 4:
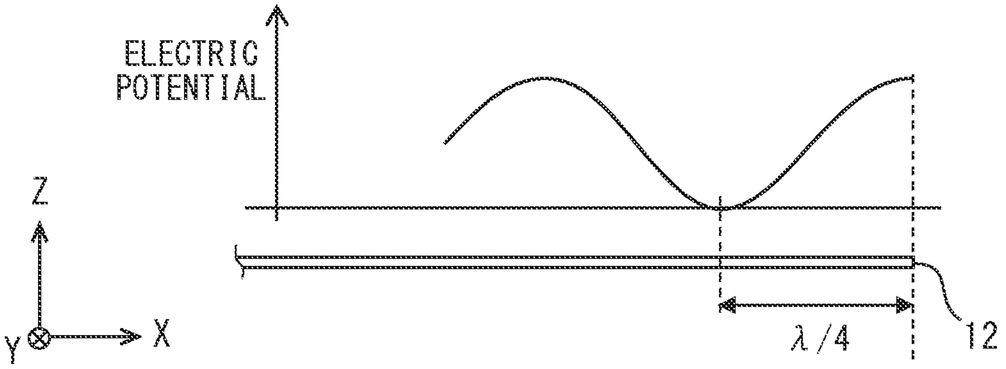
FIG. 4 is a diagram showing a potential distribution on a ground plate.

Here, since the current can be zero at the antenna far edge 12, as shown in FIG. 4, a potential at the antenna far edge 12 can be maximum, and the potential can be minimum at the position shifted by λ/4×N from the antenna far edge 12. The potential of the ground plate 10 at a point where the potential is minimum does not change even when a conductor approaches to the point. Therefore, also a current at the point where the potential is minimum does not change even when a conductor approaches the point. Consequently, according to the configuration in which the cable connection point 11 is arranged at the position that is an odd multiple of λ/4 away from the antenna far edge 12, it is possible to reduce a leakage current from the ground plate 10 to the grounding cable 51.

Figure 5:
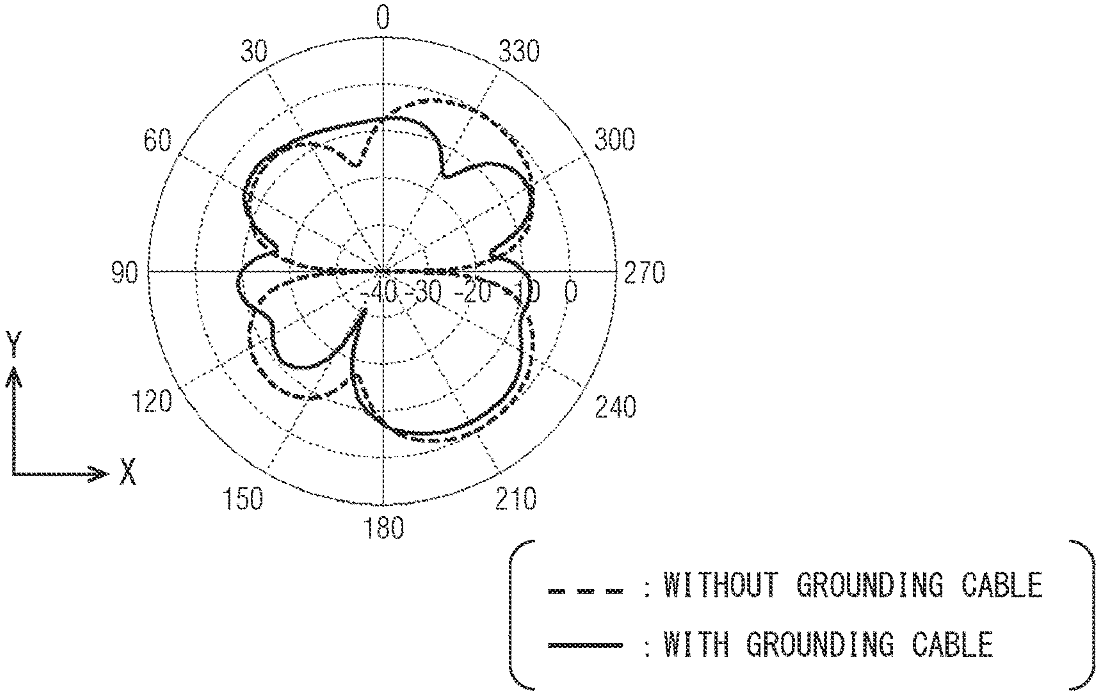
FIG. 5 is a diagram showing a result of simulation of directivity in a configuration in which a cable connection point is arranged at a position shifted by λ/2 inward from an edge of the ground plate.
Figure 6:
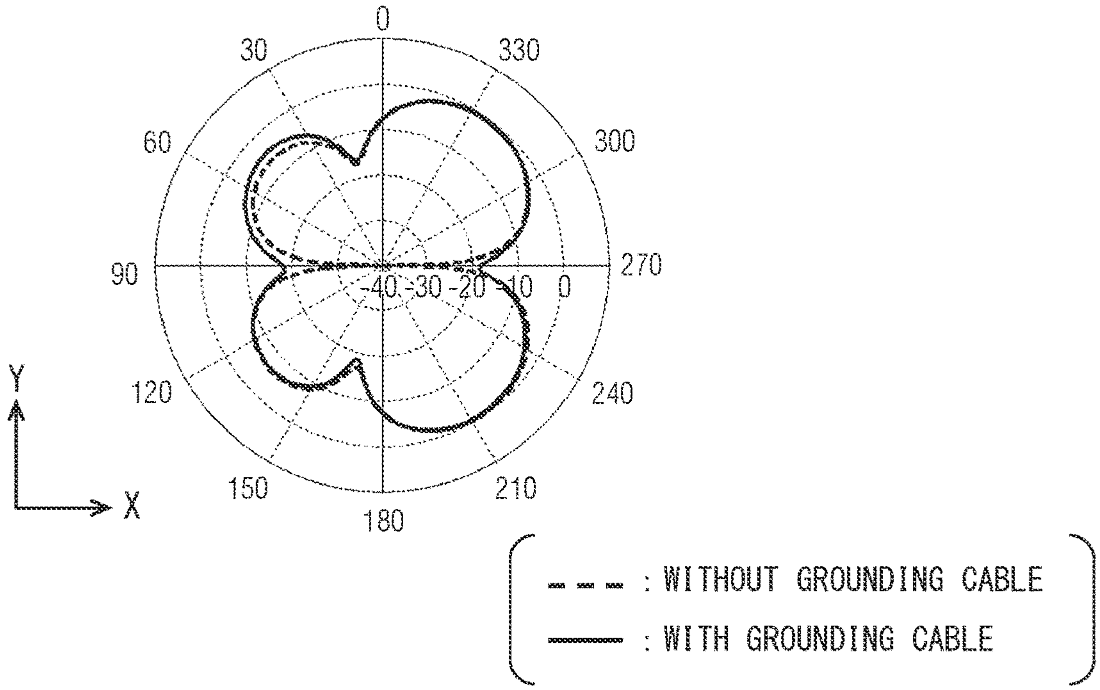
FIG. 6 is a diagram showing a result of simulation of directivity in a configuration in which the cable connection point 11 is arranged at a position shifted by λ/4 inward from the edge of the ground plate.

FIG. 5 and FIG. 6 show results of analyses on change in directivity with and without the grounding cable 51 when the cable connection point 11 is shifted from the antenna far edge 12 by λ/2 and by λ/4, respectively. FIG. 5 shows the directivity simulation result when the cable connection point 11 is located λ/2 away from the antenna far edge 12, and FIG. 6 shows the directivity simulation result when the cable connection point 11 is located λ/4 away from the antenna far edge 12. In FIGS. 5 and 6, the dashed lines show simulation results of the directivity when the grounding cable 51 does not exist, and the solid lines show the directivity simulation results when the grounding cable 51 exists. Thus, the gap between the dashed line and the solid line in each of FIGS. 5 and 6 indicates a degree of influence on the directivity by the grounding cable 51. As is clear from a comparison of FIGS. 5 and 6, according to the configuration in which the cable connection point 11 is arranged at the λ/4 point, the change in directivity due to the grounding cable 51 can be reduced. The change in directivity is caused by the leakage current to the grounding cable 51. FIGS. 5 and 6 indirectly show that the leakage current to the grounding cable 51 can be reduced by the configuration in which the cable connection point 11 is set to the λ/4 point.

As described above, according to the above configuration, even when the size of the ground plate 10 is insufficient for the target wavelength, an amount of the current leakage to the grounding cable 51 can be reduced. The above described manner of connecting the cable to the ground plate 10 is particularly effective in a configuration in which the length of the ground plate 10 in the widthwise direction is less than 0.75λ. In addition, the above described arrangement of the cable works particularly well in a configuration in which the ground plate 10 has the rectangle shape having the lengthwise direction and the antenna element 2 is adjacent to the edge of the ground plate 10 that faces in the lengthwise direction. This is because antinodes and nodes in the voltage distribution are likely to be formed. In the configuration in which the antenna element 2 is adjacent to the edge of the ground plate 10 that faces in the lengthwise direction, the current on the ground plate 10 flows toward the antenna far edge 12 that is the opposite edge from the antenna element 2, thereby causing the antinodes and nodes.

Since the antenna element 2 including the opposing conductive plate 30 and the short-circuit portion 40 causes LC parallel resonance, the antenna device 1 can transmit and receive the ground-plate vertically-polarized wave in the antenna horizontal direction. The antenna element 2 may be a monopole antenna as another embodiment capable of transmitting/receiving the ground-plate vertically-polarized wave. However, the embodiment using the monopole antenna as the antenna element 2 requires a height of λ/4. On the other hand, the antenna device 1 described above can be realized with a height (i.e., thickness) of about λ/100. That is, according to the configuration of the above-described disclosure, the height of the antenna device 1 can be reduced.

In addition, arranging the cable connection point 11 at the position shifted by an odd multiple of λ/4 from the edge of the ground plate 10 can reduce the leakage current to the grounding cable 51 without providing a circuit element such as a low-pass filter. It is possible to achieve both reduction of manufacturing costs and stabilization of antenna characteristics.

<Use of Antenna Device>

Figure 7:
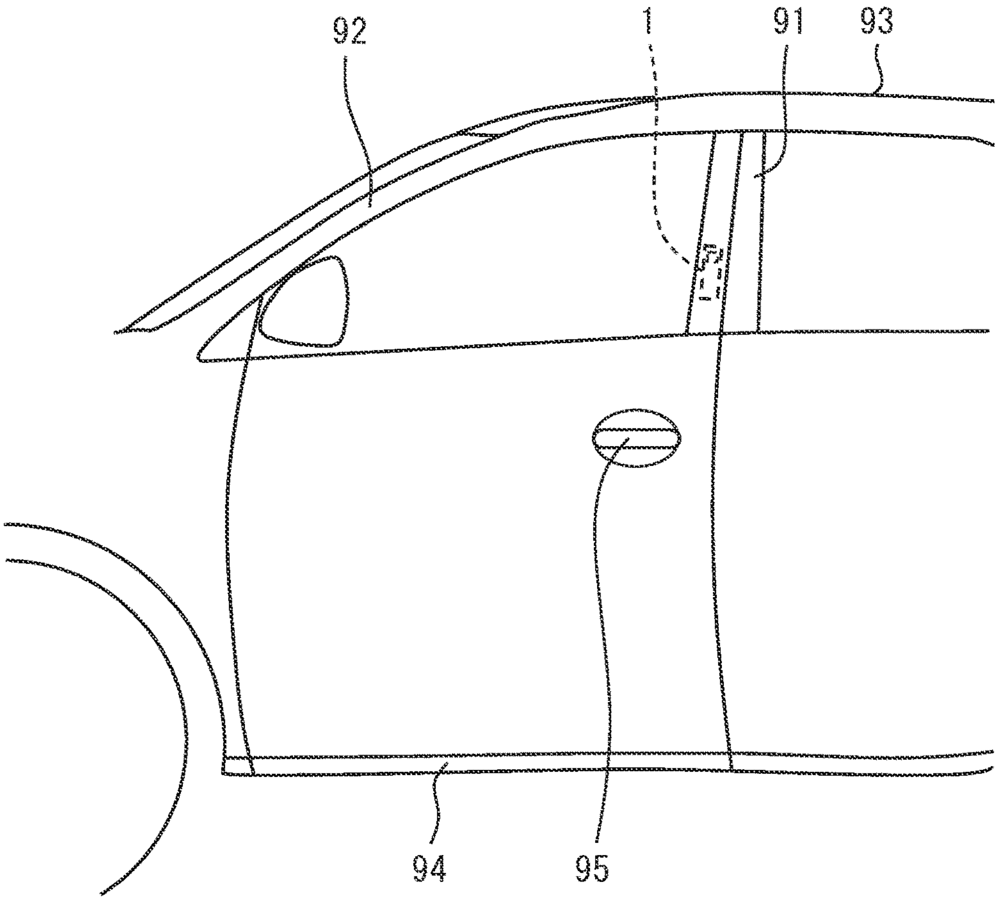
FIG. 7 is a diagram showing an example of installing the antenna device in a vehicle.

The antenna device 1 described above, for example, as shown in FIG. 7, is used while being attached to an outer surface of a B pillar 91 of a vehicle, at least in an orientation where the ground plate 10 faces the surface of the B pillar 91, and the X-axis is along a longitudinal direction of the B pillar 91 (i.e., vehicle height direction). Alternatively, the antenna device 1 may be attached in the same orientation described above to a portion inside a door panel that overlaps with the B pillar 51.

According to the above attachment state, a positive direction of the Z-axis, which is the upward direction of the antenna device 1, roughly corresponds to a width direction of the vehicle, and the antenna horizontal direction is along (i.e., parallel to) a lateral surface of the vehicle. According to this attachment state, it is possible to form a communication area along the lateral surface of the vehicle.

The attachment position and attachment orientation of the antenna device 1 may not be limited to the above examples. The antenna device 1 may be attached to an arbitrary position on the outer surface of the vehicle, such as an outer surface of an A-pillar 92 or a C-pillar, a rocker portion (i.e., side sill) 94, and an inside/vicinity of an outer door handle 95. For example, the antenna device 1 may be housed inside the outer door handle 95 such that the X-axis is along a longitudinal direction of the handle and the Y-axis is along the vehicle height direction. Also, the antenna device 1 may be installed in a roof portion 93.

Although the embodiment of the present disclosure has been described above, the present disclosure is not limited to the above-mentioned embodiment, and various supplements and modifications described below are also included in the technical scope of the present disclosure. Furthermore, in addition to the following, various changes can be made within the range that does not deviate from the scope. For example, various modifications to be described below can be executed in combination as appropriate within a scope that does not cause technical inconsistency.

<Regarding Antenna Element>

In the above-described embodiment, the antenna device 1 has the configuration including the opposing conductive plate 30 and the short-circuit portion 40 as the antenna element 2. In other words, a configuration in which a zeroth-order resonant antenna is used as the antenna element 2 has been disclosed above, but the antenna element 2 is not limited to the zeroth-order resonant antenna. The antenna element 2 may be a monopole antenna or a patch antenna. The antenna element 2 may be an inverted F antenna or a loop antenna. Various antenna configurations can be adopted as the antenna element 2 of the antenna device 1.

<Manner of Connecting Grounding Cable to Ground Plate>

Figure 8:
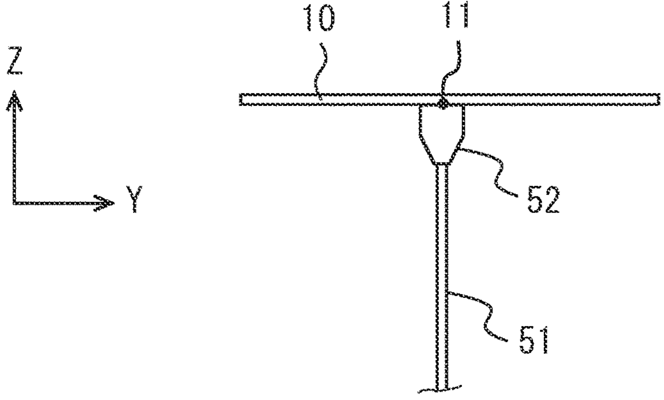
FIG. 8 is a diagram showing an example of connection between a grounding cable and the ground plate.

The grounding cable 51 may be vertically connected to the ground plate 10 at the cable connection point 11 using a connector 52 as shown in FIG. 8. This connection manner can reduce electrical or electromagnetic coupling between the grounding cable 51 and the ground plate 10 at locations other than the cable connection point 11.

Figure 9:
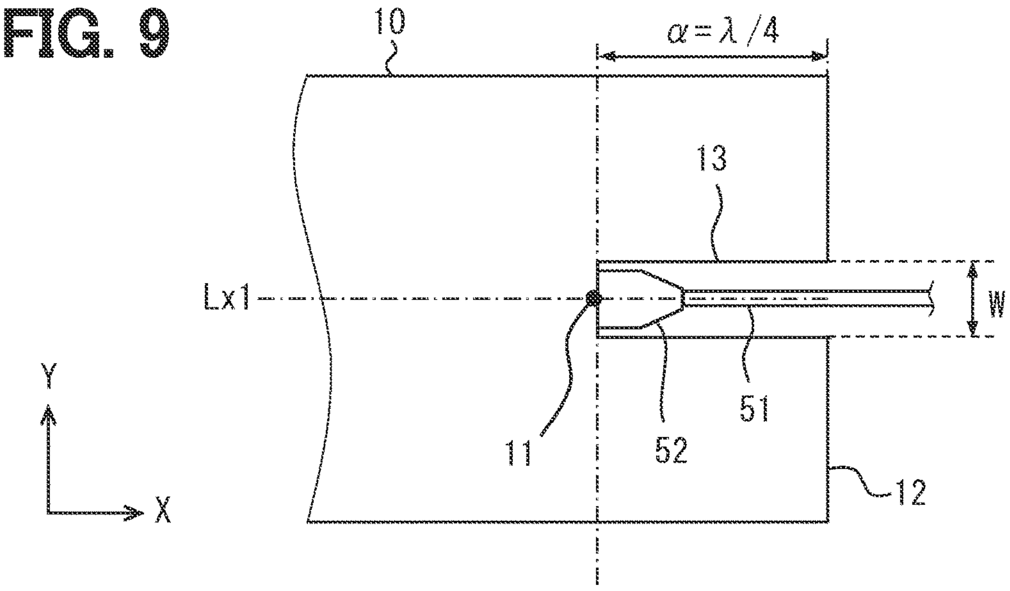
FIG. 9 is a diagram showing an example of the connection between the grounding cable and the ground plate.

As another connection manner, as shown in FIG. 9, in a case where the ground plate has a slit 13 extending from the antenna far edge 12 to the λ/4 point with a width W, the grounding cable 51 may extend along a center line of the slit 13. In the case, the grounding cable 51 is connected to the ground plate 10 at an innermost end of slit 13 in an inward direction. Here, the inward direction is a direction in which the slit 13 extends from the antenna far edge 12 to the opposite edge. In the connection configuration shown in FIG. 8, since the connector 52 is perpendicular to the ground plate 10, an overall height of the antenna device 1 is increased by a height of the connector 52. On the other hand, according to the connection configuration shown in FIG. 9, since the connector 52 is parallel to the ground plate 10, the height of the antenna device 1 can be reduced. Therefore, ease of installation of the antenna device 1 in a space having a small thickness, such as B-pillar 91, can be improved. The width W is at least wide enough to prevent electromagnetic coupling between the grounding cable 51, which extends through the center of the slit 13, and the ground plate 10. For example, the width W can be λ/10 or more. According to this configuration, a distance between the grounding cable 51 and the ground plate 10 along the Y-axis is approximately λ/20 or more, and electromagnetic coupling can be reduced.

Figure 10:
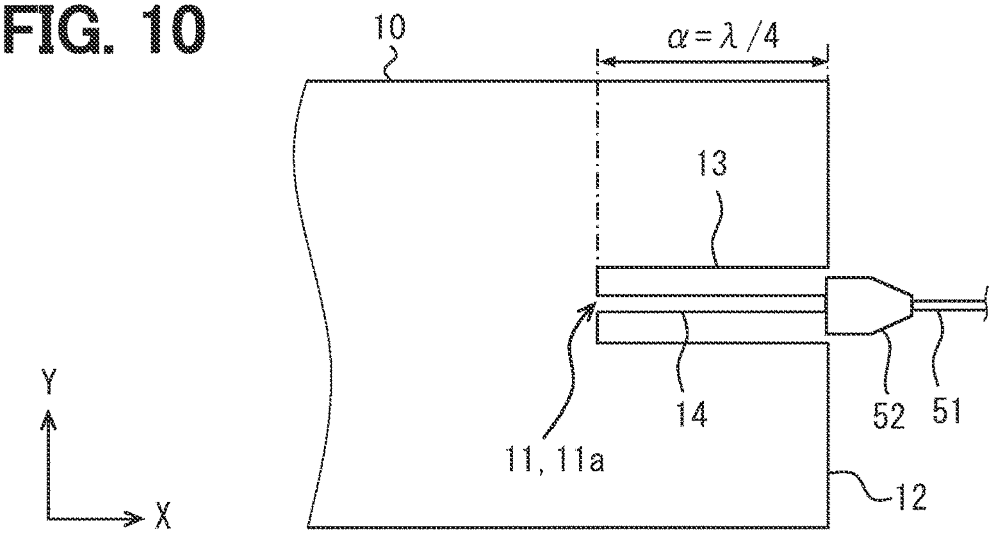
FIG. 10 is a diagram showing an example of a configuration of the ground plate.

An insulating layer similar to the support plate 20 may be provided under the ground plate 10. That is, the ground plate 10 may be provided as an inner layer of the printed circuit board. When the ground plate 10 is provided as an inner layer of an printed multilayer board, it is difficult to attach the connector 52 to the innermost end of the slit 13. Therefore, as shown in FIG. 10, the antenna device 1 may have an extension line 14 that is a conductive line extending from the λ/4 point 11*a* to the antenna far edge 12 through the center of the slit 13. The grounding cable 51 may be connected to an outer end of the extension line 14. The extension line 14 corresponds to, for example, a circuit trace. The extension line 14 may be a micro strip or a strapline. According to this configuration, while the connector 52 is placed at the antenna far edge 12, a substantial connection point can be set at the λ/4 point. Since the extension line 14 is connected to the grounding cable 51 in series, this configuration corresponds to a configuration in which the grounding cable 51 is electrically connected to the ground plate 10 via the extension line 14. The extension line 14 may be at least mounted on an insulating layer that is formed over or under the ground plate 10 as the support plate 20. When the antenna device 1 is provided as a multilayer substrate including multiple conductor layers and insulating layers, the signal cable can be electrically connected at any point on a conductor layer different from the conductor layer functioning as the ground plate 10.

<Supplement to Shape and Position of Opposing Conductive Plate Relative to Ground Plate>

The ground plate 10 has at least a substantially rectangular shape, and thus may have rounded corners. A part or whole of the edge of the ground plate 10 may have a meander shape. The rectangular shape also includes a rectangular shape having minute projections and recesses on its edge. The projections and recesses provided on the edge of the ground plate 10 and the slit formed at a position away from the edge of the ground plate 10 can be ignored in design of the external shape of the ground plate 10, as long as they do not affect the operations of the antenna device 1. Here, the minute projections and recesses have sizes of about several millimeters.

The opposing conductive plate 30 may have slits or rounded corners. For example, a notch as a degeneracy separation element may be provided at a pair of corner portions diagonally facing each other. A part or whole of the edge of the opposing conductive plate 30 may have a meander shape. Projections and recesses provided at the edge of the opposing conductive plate 30 that do not affect the operations of the antenna device 1 can be ignored.

Figure 11:
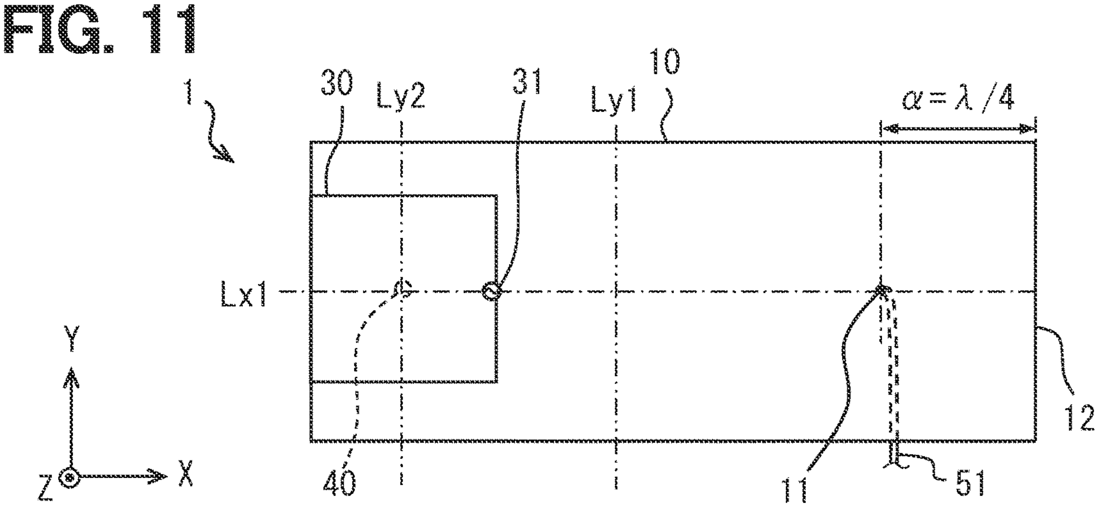
FIG. 11 is a diagram showing a modification of a position of an antenna element relative to the ground plate.
Figure 12:
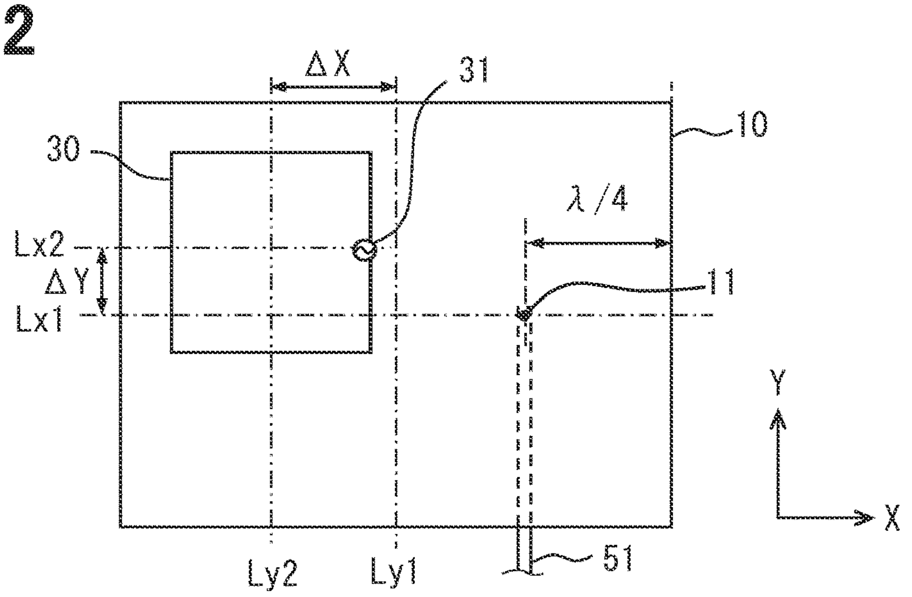
FIG. 12 is a diagram showing a modification of the position of the antenna element relative to the ground plate.
Figure 13:
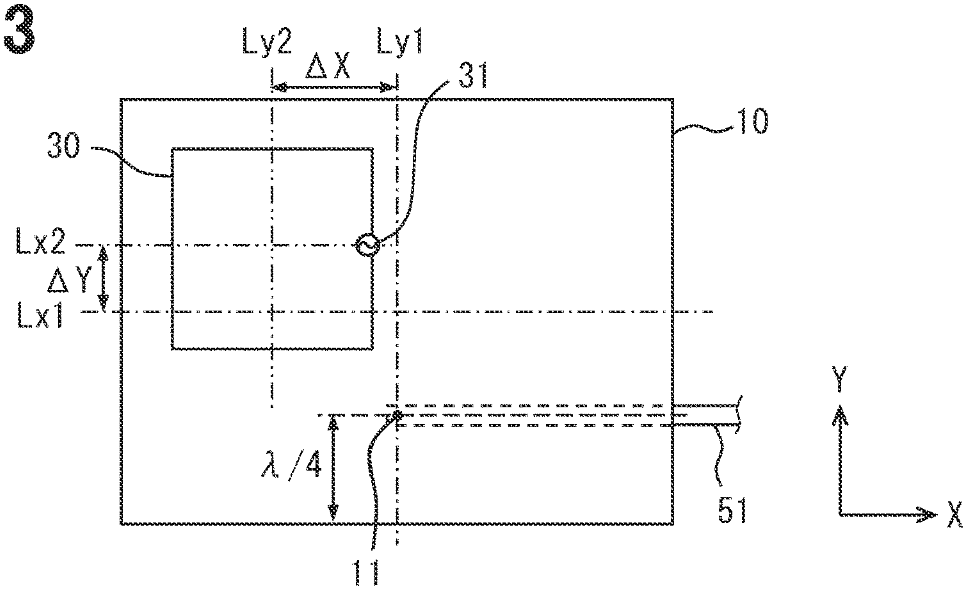
FIG. 13 is a diagram showing a modification of the position of the antenna element relative to the ground plate.

The shape of the ground plate 10 and the arrangement of the opposing conductive plate 30 relative to the ground plate 10 may not be limited to the configuration disclosed as the embodiment. The arrangement of the opposing conductive plate 30 relative to the ground plate 10 may be modified variously as illustrated in FIGS. 11 to 13. For example, as shown in FIG. 11, the opposing conductive plate 30 may be arranged so that an end of the opposing conductive plate 30 facing in the negative direction of the X-axis is aligned with an end of the ground plate 10 facing in the negative direction of the X-axis. In FIGS. 11 to 13, illustrations of the support plate 20, the transmitting/receiving circuit 70, etc. are omitted in order to clarify the positional relationship between the ground plate 10 and the opposing conductive plate 30. The dimensions of each drawing are examples and can be changed as appropriate.

Lx2 shown in FIG. 12 is a straight line passing through the center of the opposing conductive plate 30 and parallel to the X-axis. AX in FIG. 12 represents an amount of offset of the opposing conductive plate 30 relative to the ground plate 10 along the X-axis, and MY represents an amount of offset in the Y-axis direction. AX and MY may have the same value or different values. The configuration disclosed in FIG. 12 corresponds to a configuration in which the opposing conductive plate 30 is arranged so as to be displaced by a predetermined amount along the X-axis and a predetermined amount along the Y-axis from a position concentric with the ground plate 10.

An edge of the ground plate 10 used as a reference in setting the cable connection point 11 is not limited to the edge in the longitudinal direction. As shown in FIG. 13, the cable connection point 11 may be arranged at a position that is an odd multiple of λ/4 away from an edge that is relatively distant from the short-circuit portion 40 among the edges in the widthwise direction of the ground plate 10.

<Supplement to Overall Configuration of Antenna Device>

Figure 14:
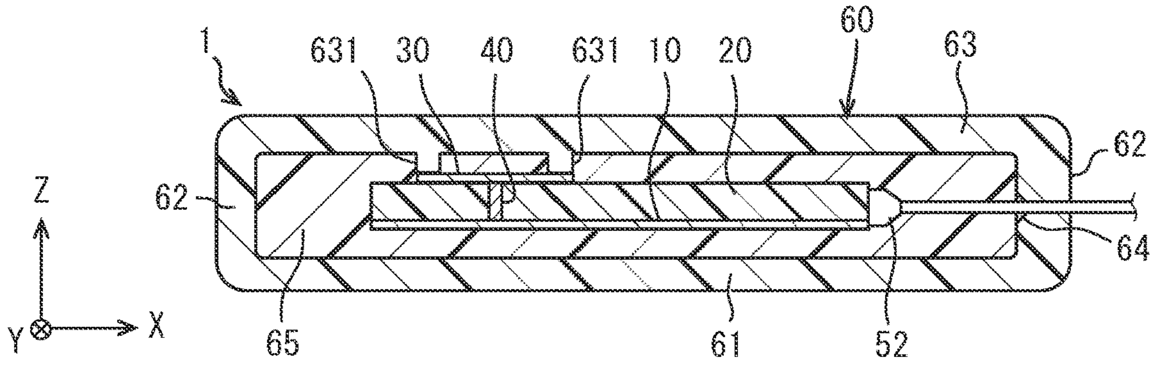
FIG. 14 is a diagram showing a configuration of the antenna device having a case.

The antenna device 1 may include a case 60 for accommodating the ground plate 10, the opposing conductive plate 30, and the support plate 20 on which the short-circuit portion 40 is formed, as shown in FIG. 14. FIG. 14 is a schematic diagram showing an internal configuration of the case 60. In order to ensure the visibility of the drawing, hatching indicating the material type is omitted in the FIG. 14. The case 60 is formed by combining, for example, an upper case and a lower case that are vertically separable. The case 60 is made of, for example, a polycarbonate (PC) resin. Various resins, such as synthetic resin obtained by mixing acrylonitrile-butadiene-styrene copolymer (so-called ABS) with PC resin, and polypropylene (PP), can be adopted as the material of the case 60. The case 60 includes a case bottom portion 61, a side wall portion 62, and a case top plate portion 63. The case bottom portion 61 provides a bottom of the case 60. The case bottom portion 61 is formed in a flat plate shape. In the case 60, a circuit board including the ground plate 10, the opposing conductive plate 30, the transmitting/receiving circuit 70 and the like is arranged so that the ground plate 10 faces the case bottom portion 61.

The side wall portion 62 provides a side surface of the case 60, and extends upward from an edge portion of the case bottom portion 61. A height of the side wall portion 62 is designed so that, for example, a distance between an inner surface of the case top plate portion 63 and the opposing conductive plate 30 is λ/25 or less. The case top plate portion 63 provides an upper surface portion of the case 60. The case top plate portion 63 in this embodiment is formed in a flat plate shape. The shape of the case top plate portion 63 may be various other shapes such as a dome shape. An inner surface of the case top plate portion 63 faces the upper surface 20*a* of the support plate 20. The side wall portion 62 has a cable lead-out portion 64 that is a hole through which the grounding cable 51 and the like are lead out. According to the configuration in which the cable lead-out portion 64 is arranged at the side wall portion 62, it is possible to improve the ease of installation of the antenna device 1 in the B-pillar 91 or the like.

When the case top plate portion 63 is disposed in a region close to the opposing conductive plate 30 as in the above configuration, a wave of the vertical electric field radiated by the LC resonance mode can be prevented from propagating around the edge of the opposing conductive plate 30 to its upper side. Thus, a radiation gain in the antenna horizontal direction can be increased. The "region close to the opposing conductive plate 30" is, for example, a region stretching from the opposing conductive plate 30 by an electrical length of 1/25 or less of the target wavelength.

In addition, as shown in FIG. 14, the case top plate portion 63 may have an upper rib 631 that is in contact with the edge of the opposing conductive plate 30. The upper rib 631 is formed on the inner surface of the case top plate portion 63 and protrudes downward. The upper rib 631 is formed so as to be in contact with the edge of the opposing conductive plate 30. The upper rib 631 fixes the position of the support plate 20 in the case 60, obstructs the propagation of the ground-plate vertically-polarized wave from the edge of the opposing conductive plate 30 to its upper side, and increases the radiation gain in the antenna horizontal direction. A metal trace such as copper foil may be printed on a vertical surface, i.e., an outer surface, of the upper rib 631 that is continuously connected to the edge of the opposing conductive plate 30.

In addition, the inside of the case 60 is filled with a sealing material 65 such as silicon The sealing material 65 may be a urethane resin such as polyurethane prepolymer. The sealing material 65 may be selected from among various other materials such as epoxy resin and silicone resin. According to the configuration in which the case 60 is filled with the sealing material 65, the sealing material 65 located above the opposing conductive plate 30 obstructs the propagation of the ground-plate vertically-polarized wave from the edge of the opposing conductive plate 30 to its upper side, thereby exerting the effect of increasing the radiation gain in the antenna horizontal direction. At least the side wall portion and the case top plate portion of the case 60 may be made of resin or ceramic having a predetermined relative permittivity. Further, according to the configuration in which the sealing material 65 fills the case 60, waterproofness, dustproofness, and vibration resistance can be improved.

Of course, the filling of the case 60 with the sealing material 65 is an optional element. The upper rib 631 may be also an optional element. The case top plate portion 63, the upper rib 631, and the sealing material 65 correspond to a radio wave shield body that obstructs the propagation of the wave of the vertical electric field radiated by the LC resonance mode from the edge of the opposing conductive plate 30 to its upper side. The configuration disclosed above corresponds to a configuration in which the radio wave shield body containing a conductor or a dielectric material is arranged on the upper side of the opposing conductive plate 30.

Either of the case bottom portion 61 or the case top plate portion 63 included in the case 60 may be omitted. When either the case bottom portion 61 and the case top plate portion 63 is omitted, the sealing material 65 may be a resin that is in a solid state within a predetermined operating temperature range assumed as a temperature range of an environment in which the antenna device 1 is used. The operating temperature range can be, for example, −30° C. to 100° C. A configuration in which one of the case bottom portion 61 and the case top plate portion 63 is omitted corresponds to a case in which the top surface or the bottom surface of the case is an opening.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An antenna device comprising:

a ground plate that is a conductor member with a flat rectangular shape; and an antenna element that is a conductor member having a feed point electrically connected to a feeder line, wherein a length of the ground plate in a predetermined direction is shorter than a target wavelength that is a wavelength of a radio wave to be transmitted or received, the ground plate is connected to a grounding cable at a connection position on the ground plate, the connection position is shifted from an edge of the ground plate by an odd multiple of ¼ of the target wavelength, the ground plate has a slit extending from the edge in a lengthwise direction of the ground plate, a length of the slit in the lengthwise direction is the odd multiple of ¼ of the target wavelength, and the grounding cable is electrically connected to an innermost end of the slit.

2. The antenna device according to claim 1, wherein a length of the ground plate in a widthwise direction of the ground plate is shorter than the target wavelength, and a length of the ground plate in the lengthwise direction is twice the length of the ground plate in the widthwise direction or more, the antenna element is arranged at a position shifted in the lengthwise direction of the ground plate from a position where the antenna element overlaps with a center of the ground plate, the ground plate has an antenna far edge that is one of edges of the ground plate in the lengthwise direction, the antenna far edge is farther from the antenna element than another of the edges of the ground plate is, and the antenna far edge is the edge of the ground plate that is shifted from the connection position by the odd multiple of ¼ of the target wavelength.

3. The antenna device according to claim 1, wherein the antenna element is arranged at one edge in the lengthwise direction of the ground plate.

4. The antenna device according to claim 1, wherein the antenna element includes:

an opposing conductive plate that is a conductor member with a flat shape, arranged to be apart from the ground plate by a predetermined distance, and has the feed point; and a short-circuit portion arranged in a central region of the opposing conductive plate and electrically connecting the opposing conductive plate and the ground plate, and the ground plate, the opposing conductive plate and the short-circuit portion are configured such that an inductance of the short-circuit portion and a capacitance between the ground plate and the opposing conductive plate cause parallel resonance at a predetermined target frequency.

5. The antenna device according to claim 1, wherein the antenna element is a monopole antenna, a patch antenna, an inverted F antenna, or a loop antenna.

6. The antenna device according to claim 1, wherein the grounding cable is perpendicularly connected to the ground plate.

7. An antenna device comprising:

a ground plate that is a conductor member with a flat rectangular shape; and an antenna element that is a conductor member having a feed point electrically connected to a feeder line, wherein a length of the ground plate in a widthwise direction of the ground plate is shorter than a target wavelength that is a wavelength of a radio wave to be transmitted or received, and a length of the ground plate in a lengthwise direction of the ground plate is twice the length of the ground plate in the widthwise direction or more, the antenna element is arranged at a position shifted in the lengthwise direction of the ground plate from a position where the antenna element overlaps with a center of the ground plate, the ground plate has an antenna far edge that is one of edges of the ground plate in the lengthwise direction, the antenna far edge is farther from the antenna element than another of the edges of the ground plate is, the ground plate is connected to a grounding cable at a connection position on the ground plate, and the connection position is shifted from the antenna far edge of the ground plate by an odd multiple of ¼ of the target wavelength.

8. An antenna device comprising:

a ground plate that is a conductor member with a flat rectangular shape;

an antenna element that is a conductor member having a feed point electrically connected to a feeder line; and a conductive line, wherein a length of the ground plate in a widthwise direction of the ground plate is shorter than a target wavelength that is a wavelength of a radio wave to be transmitted or received, and a length of the ground plate in a lengthwise direction of the ground plate is twice the length of the ground plate in the widthwise direction or more, the antenna element is arranged at a position shifted in the lengthwise direction of the ground plate from a position where the antenna element overlaps with a center of the ground plate, the ground plate has an antenna far edge that is one of edges of the ground plate in the lengthwise direction, the antenna far edge is farther from the antenna element than another of the edges of the ground plate is, the ground plate has a slit extending from the antenna far edge to the other of the edges in the lengthwise direction, a length of the slit in the lengthwise direction is an odd multiple of ¼ of the target wavelength, the conductive line is arranged on a center line of the slit and extends along the center line of the slit, the ground plate is connected to a grounding cable via the conductive line, and an end of the conductive line is connected to an innermost end of the slit and another end of the conductive line is connected to the grounding cable.

9. An antenna device comprising:

a ground plate that is a conductor member with a flat rectangular shape; and an antenna element that is a conductor member having a feed point electrically connected to a feeder line, wherein a length of the ground plate in a predetermined direction is shorter than a target wavelength that is a wavelength of a radio wave to be transmitted or received, the ground plate is connected to a grounding cable at a connection position on the ground plate, the connection position is shifted from an edge of the ground plate by an odd multiple of ¼ of the target wavelength, and the antenna element is arranged at one edge in a lengthwise direction of the ground plate.

10. An antenna device comprising:

a ground plate that is a conductor member with a flat rectangular shape; and an antenna element that is a conductor member having a feed point electrically connected to a feeder line, wherein a length of the ground plate in a predetermined direction is shorter than a target wavelength that is a wavelength of a radio wave to be transmitted or received, the ground plate is connected to a grounding cable at a connection position on the ground plate, and the connection position is shifted from an edge of the ground plate by an odd multiple of ¼ of the target wavelength, the antenna element includes:

an opposing conductive plate that is a conductor member with a flat shape, arranged to be apart from the ground plate by a predetermined distance, and has the feed point; and a short-circuit portion arranged in a central region of the opposing conductive plate and electrically connecting the opposing conductive plate and the ground plate, and the ground plate, the opposing conductive plate and the short-circuit portion are configured such that an inductance of the short-circuit portion and a capacitance between the ground plate and the opposing conductive plate cause parallel resonance at a predetermined target frequency.

* * * * *